United States Patent
Angantyr et al.

(10) Patent No.: US 7,954,376 B2
(45) Date of Patent: Jun. 7, 2011

(54) METHOD AND DEVICE FOR BALANCING A ROTOR OF AN ELECTRICAL MACHINE

(75) Inventors: Anders Angantyr, Vasteras (SE); Gabor Csaba, Vasteras (SE)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 12/339,717

(22) Filed: Dec. 19, 2008

(65) Prior Publication Data
US 2009/0151450 A1 Jun. 18, 2009

Related U.S. Application Data

(63) Continuation of application No. PCT/EP2007/054472, filed on May 9, 2007.

(30) Foreign Application Priority Data

Jun. 22, 2006 (EP) .................................. 06115919

(51) Int. Cl.
*G01M 1/00* (2006.01)
(52) U.S. Cl. .................... 73/458; 73/66; 73/487; 73/468
(58) Field of Classification Search .................... 73/458, 73/487, 471, 66, 457, 460, 461, 468
See application file for complete search history.

(56) References Cited

U.S. PATENT DOCUMENTS

| | | | | |
|---|---|---|---|---|
| 3,746,409 A | * | 7/1973 | Heiland | 384/215 |
| 3,812,725 A | * | 5/1974 | Frank et al. | 73/462 |
| 3,924,473 A | * | 12/1975 | Maus | 73/471 |
| 4,490,638 A | | 12/1984 | Lind | |
| 4,573,355 A | * | 3/1986 | Reutlinger | 73/455 |
| 4,726,690 A | * | 2/1988 | Thelen | 384/99 |
| 4,905,515 A | * | 3/1990 | Himmler | 73/471 |
| 5,219,454 A | * | 6/1993 | Class | 416/145 |
| 5,235,228 A | * | 8/1993 | Nakanura et al. | 310/51 |
| 5,365,166 A | * | 11/1994 | Dailey et al. | 324/750.22 |
| 5,481,929 A | * | 1/1996 | Kohlert et al. | 73/865.8 |
| 5,557,216 A | * | 9/1996 | Dailey et al. | 324/750.16 |
| 6,580,186 B1 | | 6/2003 | Suzuki et al. | |
| 6,904,371 B2 | * | 6/2005 | Sonnichsen et al. | 702/56 |
| 7,252,000 B2 | * | 8/2007 | Care et al. | 73/462 |
| 7,321,809 B2 | * | 1/2008 | Vian et al. | 700/279 |

(Continued)

FOREIGN PATENT DOCUMENTS

| | | | |
|---|---|---|---|
| EP | 0470265 A1 | | 2/1992 |
| JP | 53127607 A | | 11/1978 |
| JP | 57000054 A | * | 1/1982 |
| WO | 9300592 A | | 1/1993 |
| WO | 9418574 A | | 8/1994 |

*Primary Examiner* — Hezron Williams
*Assistant Examiner* — Samir M Shah
(74) *Attorney, Agent, or Firm* — Volpe and Keating, P.C.

(57) ABSTRACT

A balancing device is provided that is able to balance a rotor of an electrical machine. The machine includes a mounted rotor in a central bore of a stator and coaxially thereto. Between the rotor and the stator there is an air gap. The rotor preferably comprises a plurality of axially extending ferromagnetic teeth and non-magnetic wedges being arranged alternately around the circumference of the surface of the rotor. The teeth and/or the wedges preferably include balancing openings for balancing weights. The balancing device includes a mounting device and/or a locking device and/or a confirmation device. The device has a radial height that is smaller than the minimal clearance of the air gap and an axial extension such that it can be inserted into the air gap. With such a device it is possible to balance a rotor in an efficient way, when it is located in the bore of the stator.

13 Claims, 8 Drawing Sheets

U.S. PATENT DOCUMENTS

| | | | |
|---|---|---|---|
| 7,343,663 B2 * | 3/2008 | Hodowanec et al. | 29/598 |
| 7,363,111 B2 * | 4/2008 | Vian et al. | 700/279 |
| 7,400,943 B2 * | 7/2008 | Vian et al. | 700/279 |
| 7,412,884 B2 * | 8/2008 | Feldmann et al. | 73/462 |
| 7,426,858 B2 * | 9/2008 | Otten | 73/468 |
| 7,458,262 B2 * | 12/2008 | Hodowanec et al. | 73/460 |
| 7,555,825 B2 * | 7/2009 | Hodowanec et al. | 29/598 |
| 7,555,939 B2 * | 7/2009 | Lucas et al. | 73/66 |
| 7,654,138 B2 * | 2/2010 | Thelen | 73/471 |
| 7,686,403 B2 * | 3/2010 | Douglas | 301/5.21 |

\* cited by examiner

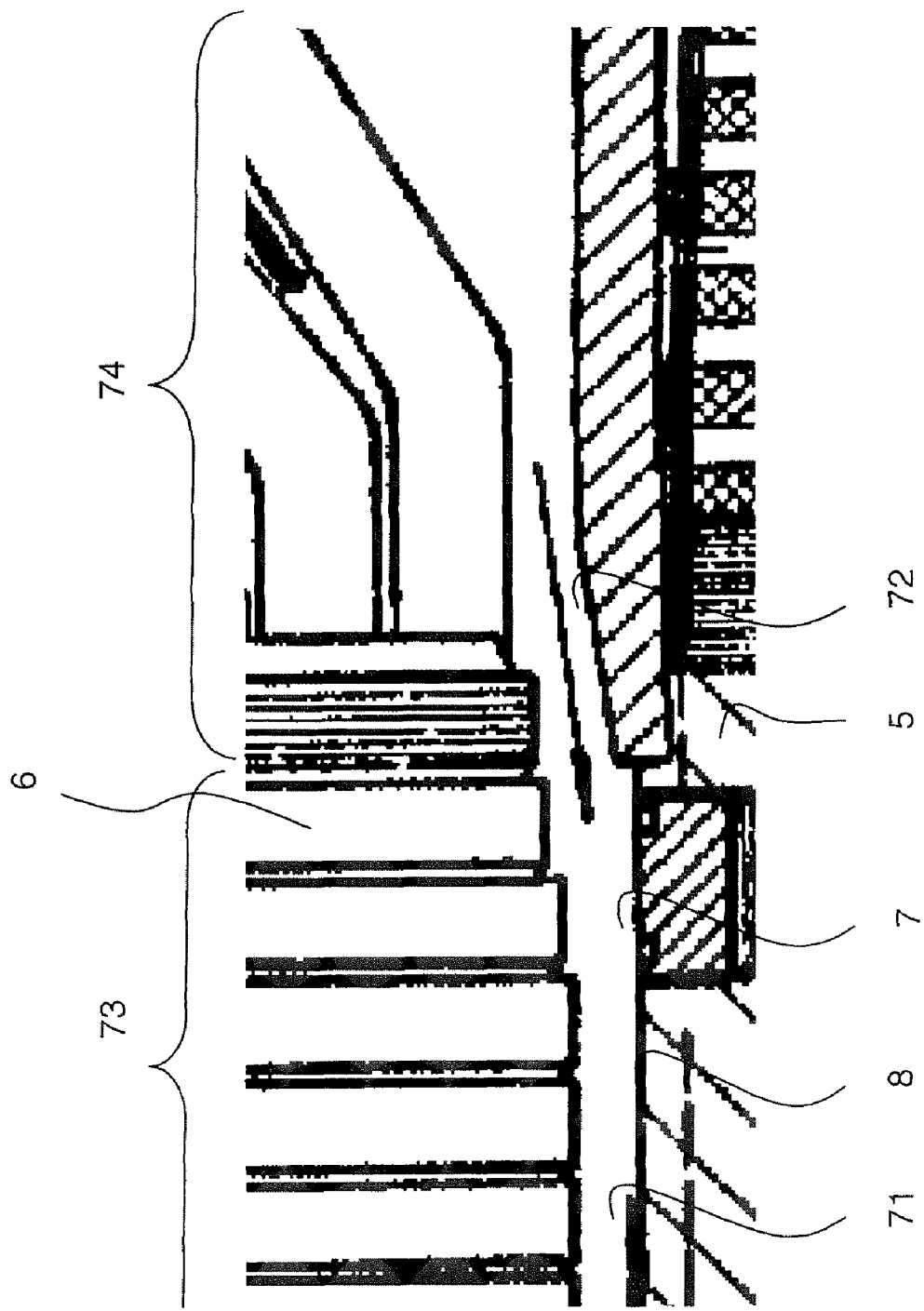

METHOD AND DEVICE FOR BALANCING A ROTOR OF AN ELECTRICAL MACHINE

CROSS REFERENCE TO RELATED APPLICATIONS

This application is a continuation of International Application No. PCT/EP2007/054472 filed May 9, 2007, which claims priority to European Patent Application No. 06115919.0 filed Jun. 22, 2006, the contents of both of which are incorporated by reference as if fully set forth.

FIELD OF INVENTION

The invention relates to a device and a method to balance a rotor of an electrical machine.

BACKGROUND

Electrical machines transform mechanical energy into electrical energy (generator) and vice versa (motor). Electrical machines usually comprise a rotor and a stator. The rotor rotates within a bore that is provided in the stator. When used in generators, such a rotor may have a length from 1 meter up to 6 meters or even more. Also the diameter may vary from 250 mm up to 1200 mm or even more. Due to high rotational speeds and weight of the rotor, careful balancing is compulsory.

A lack of balance will lead to vibration. Vibrations are detrimental in view of lifetime of the mechanical components such as bearings etc. Furthermore it is not possible to pass a critical rotational speed with a rotor that is not balanced. If the balancing state of the rotor does not reach a certain degree, it is possible that the electrical machine will be damaged. Especially if the electrical machine will be operated over longer time period.

Balancing of a new rotor during construction of the same is not an issue, because this step is usually done in a high speed balancing pit. After planned or unplanned maintenance work during operation however, the step of balancing the rotor is a problem. Rewinding work is one maintenance operation that serves as an example. During such a procedure the rotor is removed from the bore of the stator. It is then shipped or transported to a workshop of the manufacturer. In the workshop of the manufacturer the rewinding work, replacing step or any other maintenance work will be carried out. However it has to be noted that it is possible to carry out such a replacement and many other maintenance steps in the power plant itself, meaning on site. After the replacing step is finished, the rotor is often out of balance and the step of balancing the rotor becomes necessary. This step is nowadays conducted on a balancing pit located at the workshop of the manufacturer. Usually a power plant, in which the rotor is used, does not have an own balancing pit and therefore transporting the rotor from the power plant to the workshop of the manufacturer becomes compulsory for the balancing step. The step of transporting the rotor to the workshop of its manufacturer is usually time consuming, costly and leads to an even longer interruption of operation.

SUMMARY

The present disclosure is directed to a balancing device for balancing a rotor of an electrical machine. The electrical machine includes a mounted rotor in a central bore of a stator and coaxially thereto and between the rotor and the stator there is an air gap. The rotor includes a plurality of axially extending ferromagnetic teeth and non-magnetic wedges arranged alternately around the circumference of the surface of the rotor. At least one of the teeth or the wedges has balancing openings for balancing weights. The balancing device includes a mounting device and/or a locking device and/or a confirmation device. The device has a radial height that is smaller than the minimal clearance of the air gap and an axial extension such that it can be inserted into the air gap.

The present disclosure is also directed to a method of balancing a rotor of an electrical machine. The rotor being located in a bore of a stator with an air gap defined between the rotor and the bore. The method includes mounting a balancing weight and/or a test weight to the rotor through said air gap.

BRIEF DESCRIPTION OF THE DRAWINGS

The drawings will be explained in greater detail by a description of an exemplary embodiment, with reference to the following figures:

FIG. 1 shows a cross-sectional view of the gap in the terminal region between a stator and a rotor of the electrical machine;

DETAILED DESCRIPTION OF THE PREFERRED EMBODIMENTS

Introduction to the Embodiments

Figure 2A:
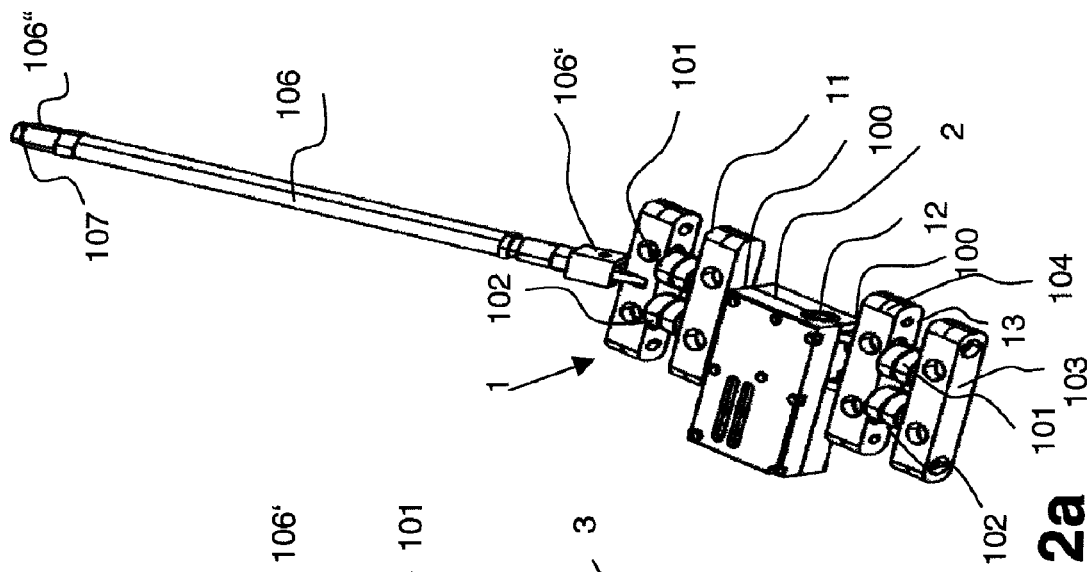
FIG. 2a-c shows the balancing device with a mounting device, a locking device and a confirmation device according to the present invention.

An object of the present invention is to provide a method and a device to balance a rotor of an electrical machine in an efficient way, preferably with the rotor located in the bore of the stator.

A balancing device according to the present invention is able to balance a rotor of an electrical machine in an efficient manner. The machine comprises a mounted rotor in a central bore of a stator and coaxially thereto. Between the rotor and the stator there is an air gap. The rotor preferably comprises a plurality of axially extending ferromagnetic teeth and non-magnetic wedges being arranged alternately around the circumference of the surface of the rotor. The teeth and/or the wedges, or generally the rotor surface, comprise balancing openings for balancing weights. The balancing device comprises a mounting device and/or a locking device and/or a confirmation device. The device has a radial height that is smaller than the minimal clearance of the air gap and an axial extension such that it can be inserted into the air gap.

It is possible to introduce such a balancing device into the air gap of an electrical machine for balancing the same. This is particularly advantageous, because demounting of the rotor is not necessary any more. Thus the balancing procedure is more efficient, repair time can be limited and costs can be saved.

The air gap has a substantially constant clearance in the middle area of the rotor due to cylindrical shape of rotor and bore, and a varying clearance in the terminal regions due to varying diameters of rotor and bore. The device therefore preferably comprises at least a first section and a second section, which first section and second section are moveable in respect of each other, in order to pass through the air gap in the terminal regions.

This is advantageous since a device according to the present invention can be used or adapted for/to several electrical machines which terminal regions of which have different shapes.

The balancing device preferably further comprises a third section, which third section is moveable in respect of the first section and/or in respect of the second section in order to pass through an air gap with varying clearance.

Therefore a preferably chain-like structure is being built by the first section and/or the second section and/or the third section.

Such a chain-like structure may be handled from the operating personnel with particular ease.

The first section and/or the second section and/or the third section preferably comprise at least a guiding element for circumferential guidance, a contact element for establishing a contact between the surface of the rotor and the device, and an actuation element, for axial movement of the device.

The guiding element preferably comprises at least a first magnet and a second magnet, wherein the magnetic field of the first magnet and of the second magnet interacts with the field of the ferromagnetic teeth of the rotor, causing the balancing device to be centrally arranged over at least one of the ferromagnetic teeth or over at least one of the non-magnetic wedges.

The contact element is preferably a roller bearing. The actuation element is a flexible rod that is pivotably connected to the balancing device.

The balancing device preferably comprises an adjustable camera as a positioning aid and a light emitting device for providing light in the focus area of the camera. The image captured by the camera may be transmitted to a display, such as computer monitor or video glasses.

This allows an easy positioning of the balancing device in the air gap.

The mounting device preferably comprises in one of its sections a holder for holding at least one balancing weight and a mounting tool for mounting the balancing weight.

The locking device comprises on its side facing the surface of the rotor a locking tool for locking the balancing weight.

The locking tool for locking the balancing weight is preferably a center punch that is driven by a hydraulic piston in order to provide a punchmark for securing the balancing weight against loosening due to vibrations etc.

The invention also relates to a method of balancing a rotor of an electrical machine while the rotor is located in the bore a stator. There is an air gap between rotor and bore. A balancing weight and/or a test weight are mounted onto and/or into the rotor through the air gap.

Preferably the mounting is conducted by using a device according to the present invention.

Preferably the method further comprises: a step of determining a position, where a balancing weight has to be placed, whereby said step comprises substeps of introducing at least one test weight into the air gap, mounting said at least one test weight onto the rotor, running the rotor in order to measure vibrations, and removing said at least one test weight; and/or a step of introducing a balancing device into the air gap between the rotor and the stator; and/or a step of positioning the balancing device at the determined position; and/or a step of mounting the balancing weight.

Additionally the method preferably comprises a further step of locking the balancing weight.

Additionally the method preferably comprises a further step of checking if all the balancing weights have been locked.

DETAILED DESCRIPTION

FIG. 1 shows an electrical machine in a cross sectional view. The electrical machine comprises a rotor 5 and a stator 6, wherein the rotor 5 is mounted in a central bore 8 of the stator 6 and coaxially thereto. Between the rotor 5 and the stator 6 there is an air gap 7.

The rotor 5 comprises a plurality of axially extending ferromagnetic teeth and axially extending wedges made of a nonmagnetic material, such as for example copper or aluminum. The teeth and the wedges are arranged alternately around the circumference of the surface of the rotor 5. Balancing openings for receiving balancing weights are arranged in the teeth and/or in the wedges. The balancing openings are preferably distributed with an equal distance between one and the other over the whole length of the teeth and/or the wedge. Such an arrangement may be designated as row or balancing opening row. Other arrangements are also possible. Such a balancing opening may be a simple radial hole, a threaded hole or a hole equipped with a bayonet catch. Other balancing openings are also conceivable, if they are able to hinder a balancing weight from being detached from the rotor 5, if the rotor 5 is rotating. This means that the balancing weights need to be secured in radial direction.

The air gap 7 has a substantially constant clearance 71 in the middle area 73 of the rotor 5. This is due to the cylindrical shape of the rotor 5 and the bore 8. The constant clearance 71 has a actually the shape of an annular gap, if viewed axially. Since the rotor 5 and the stator 6 have varying diameters in a terminal region 74 of the rotor 5, usually in front or in the region of the retaining rings, the clearance between rotor 5 and stator 6 is varying. This is designated as varying clearance 72. An electrical machine comprises usually two terminal regions.

In the present embodiment the balancing weight has the shape of a setscrew or headless pin. Such a headless pin has a cylindrical shape, wherein the cylindrical surface is provided with a threaded structure. On the surface of the pin there is arranged an opening that is able to engage with a corresponding tool in a form closure. Usually a hexagon socket is used for such a purpose. The balancing weight will be introduced into one of the balancing openings. Depending on the depth of the balancing opening and the length of the pin, it is possible to introduce more than one balancing weight into one balancing opening.

Figure 2B:
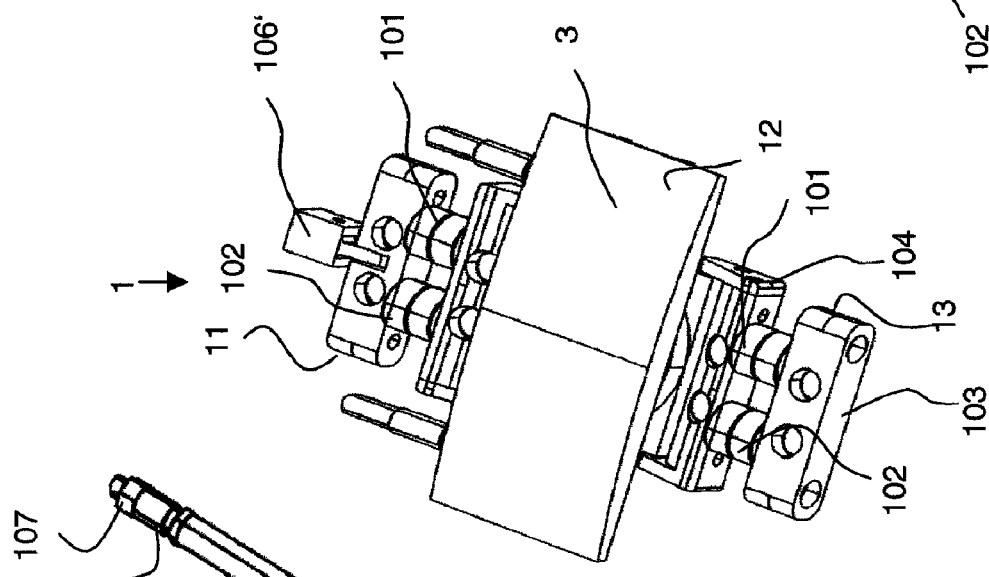
Figure 2C:
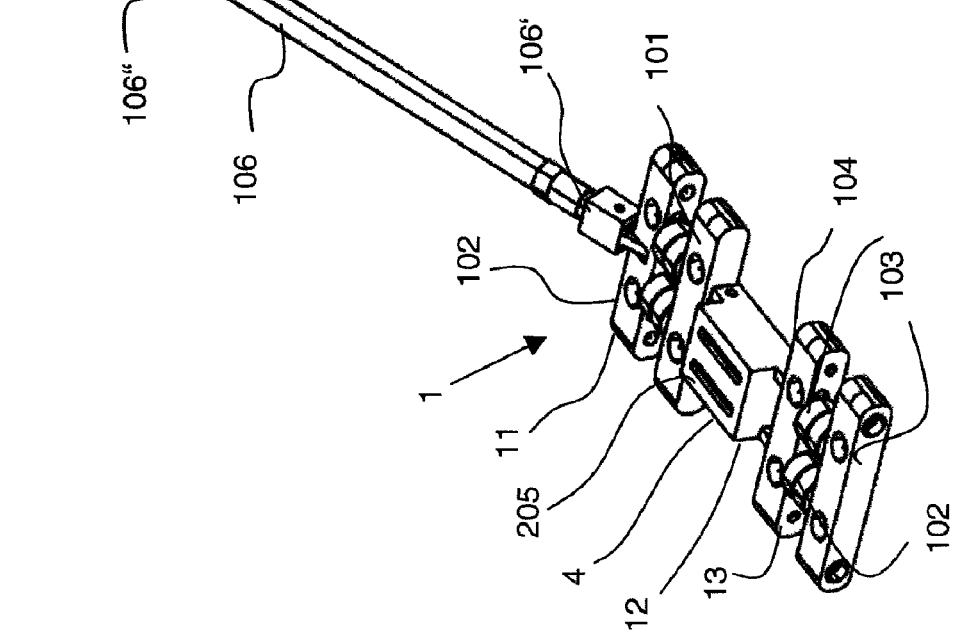
Figure 3:
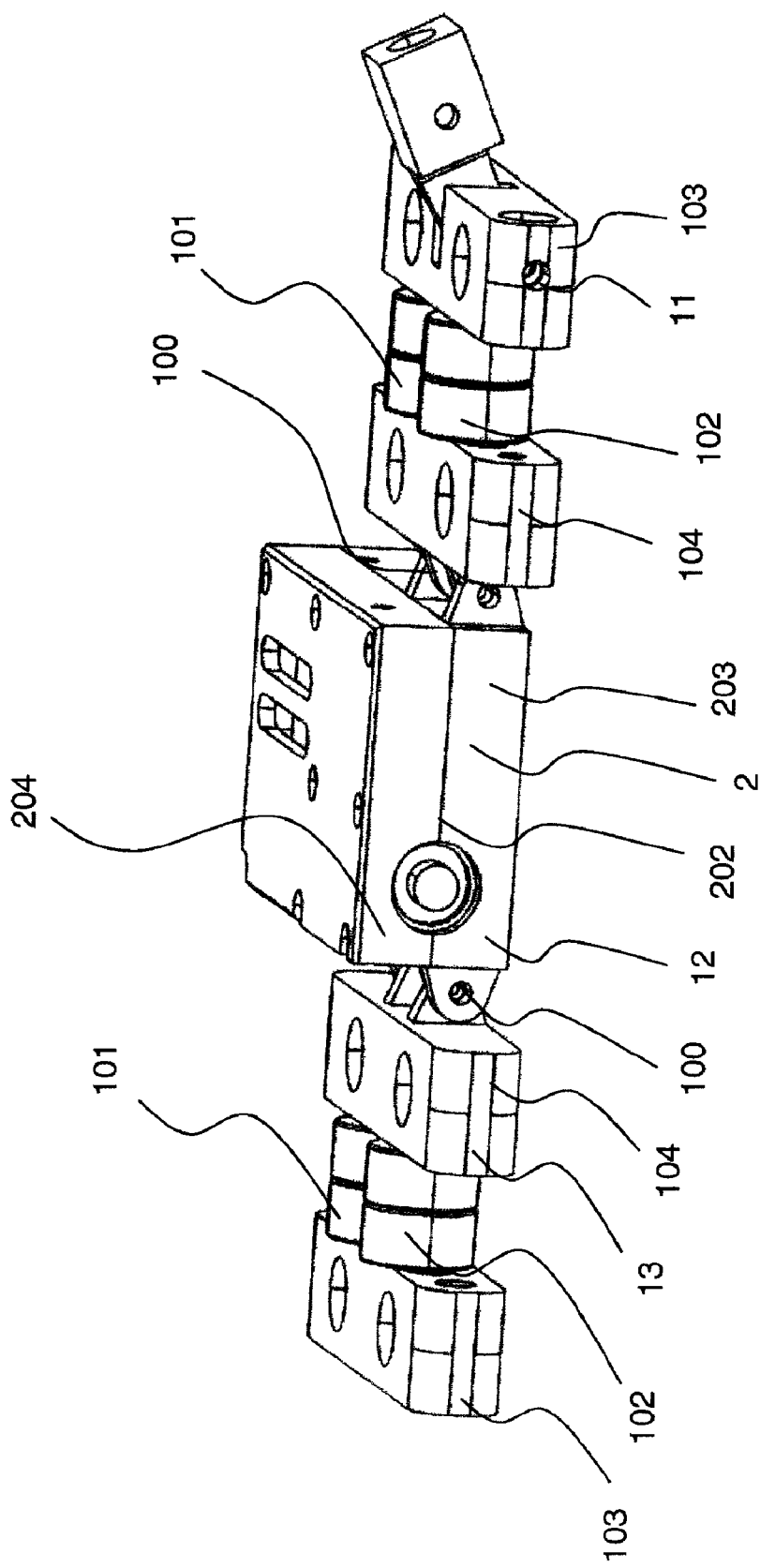
FIG. 3 shows the mounting device of FIG. 2a in a perspective view from above.

FIGS. 2*a-c* show the balancing device 1 according to the present invention. The balancing device 1 comprises a mounting device 2 and/or locking device 3 and/or a confirmation device 4. The balancing device 1 has a radial height that is smaller than the minimal clearance of the air gap 7. This means that the balancing device 1 is able to be introduced into the air gap 7. Furthermore the balancing device 1 has an axial extension that has a dimension which enables the balancing device 1 to be inserted through the terminal region 74 with the varying clearance 72 without being blocked by the surface of the rotor 5 or the bore 8 of the stator 6. Therefore the axial length of the balancing device 1 also a limiting factor for introducing the balancing device 1 through the terminal region 74 into the middle area 73. However the dimension of the limiting axial length depends on the physical design of the terminal region.

In the preferred embodiment as shown in FIGS. 2*a*-*c* it may be seen that the balancing device 1 comprises at least two, here three sections. Namely a first section 11, a second section 12 and a third section 13. The first section 11 is connected to the second section 12, both of which are moveable with respect of each other. In the present embodiment the first section 11 is connected to the second section by a hinge 100. The axis of the hinge 100 is preferably orientated tangentially and/or axially to the rotor 5. Other suitable devices may also be used for that purpose. The third section 13 is connected to the second section 12 in the same manner. Therefore the balancing device 1 of the present invention is a structure having three sections 11, 12, 13 which are moveable or pivotable in respect of each other. Preferably the sections 11, 12, 13 are arranged one behind the other, so that a chain-like structure results.

It is clear that if the overall length of the chain is chosen to be smaller than the limiting axial length, i.e. having a suitable length to pass the terminal section without being blocked by the surfaces of the rotor 5 or bore 8, it is possible that the balancing device 1 may comprise only one section. The overall length may also be designated as axial length. If for some reasons the overall axial length has to be longer, more sections have to be connected together. The number of sections of a balancing device 1 with a given length depends therefore on the physical characteristics of the terminal region 72.

At least one of the sections, in the preferred embodiment the first section 11 and the last section 13 comprise at least a guiding element. The guiding element is responsible for circumferential guidance of the balancing device 1 on the surface of the rotor 5. In the preferred embodiment the guiding elements are magnets 101, 102 of cylindrical shape having a central axis. The magnets 101, 102 are arranged between a first yoke 103 and a second yoke 104 in a manner that their central axes are parallel. When the balancing device 1 is placed on the surface of the rotor 5, the magnetic field of the two magnets 101, 102 interact with the field of the ferromagnetic teeth. Thereby the balancing device 1 may be positioned over such a teeth and due to the interaction between the magnetic field of the magnets 101, 102 and the field of the ferromagnetic teeth the balancing device 1 will remain in a self-centering and stable position. For that reason it is possible that the balancing device 1 may be moved in the direction of the teeth, i.e. axially, in a manner without shifting tangentially. The actual position above the teeth or above the wedges depends on the distance between the magnets 101, 102 and on the arrangements of the same. It is possible that the balancing device 1 will be positioned over a single tooth, over a single tooth and a single wedge or over several teeth and several wedges.

Figure 4:
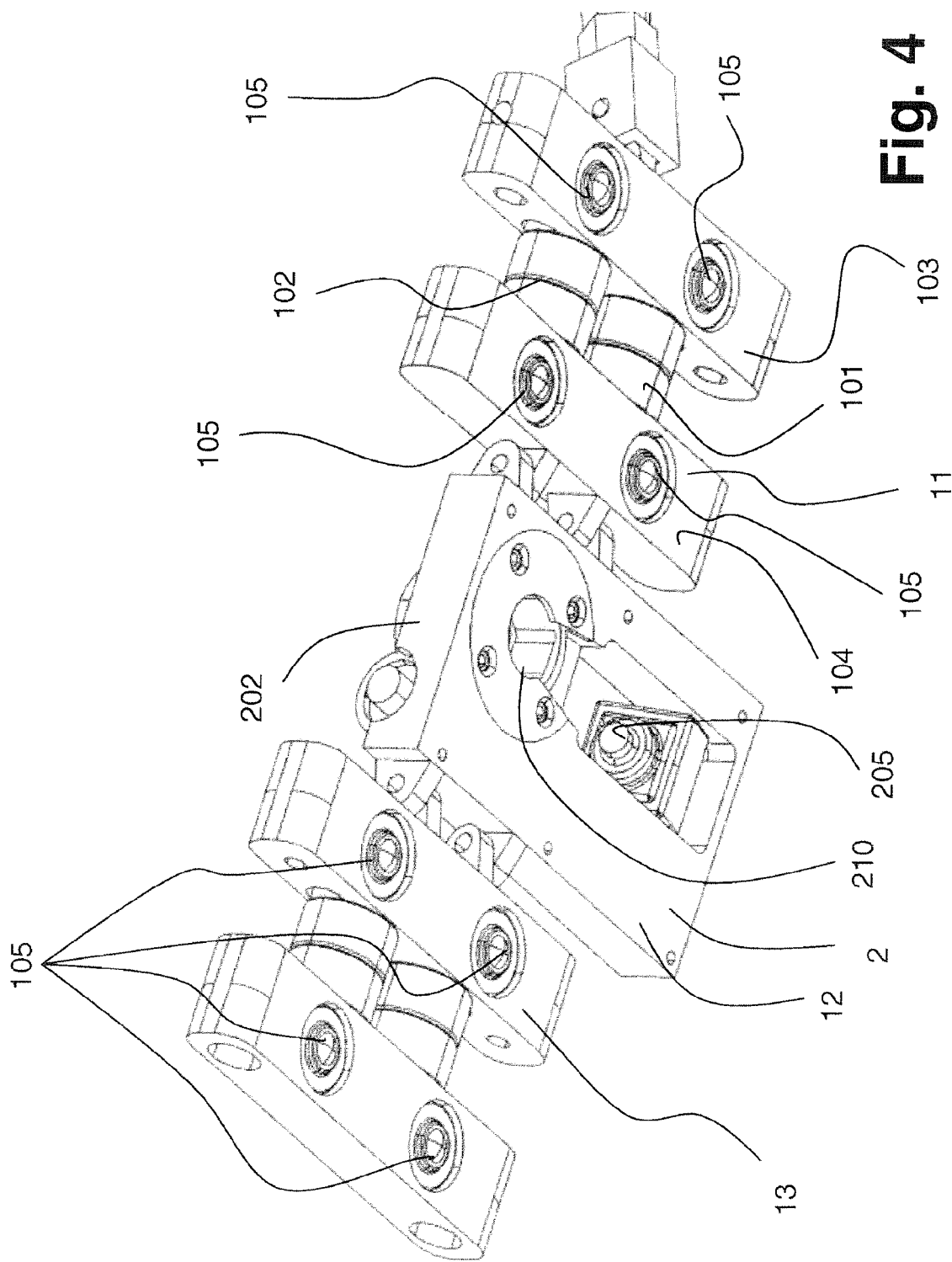
FIG. 4 shows the mounting device of FIGS. 2a and 3 in a perspective view from below.

At least one of the sections, in the preferred embodiment the first section 11 and the third section 13 comprise at least a contact element. The contact element is responsible for establishing a contact between the surface of the rotor 5 and the balancing device 1. As it may be seen in FIG. 4 the contact element used in the preferred embodiment is a roller bearing 105. In the present embodiment four roller bearings 105 are arranged in the first section 11 and four roller bearings 105 are arranged in the second section 12. Thereby the two roller bearings 105 are incorporated in the yokes 103, 104. Roller bearings 105 are particularly suitable for such a purpose, since the rolling friction between the balancing device 1 and the surface of the rotor 5 is reduced to a minimum. Other suitable elements may also be used for such a purpose.

With reference to FIG. 2*a*-*c* it can be seen that at least one of the sections comprises an actuation element. Such an actuation element is used to move the balancing device 1 in the air gap 7 along the wedges or teeth back and forth. In the present embodiment the actuation element is a rod 106 that is, with its first end 106', pivotably connected to the first section 11 of the balancing device 1. The rod will be operated by an operator who has to push the rod 106 in order to move the balancing device 1 as described. The rod 106 has elastic properties. This is necessary, because the rod 106 has to enable to pass through the terminal region 74, where the air gap 7 has a varying clearance 72. A second end 106" of the rod 106 is equipped with a connector or a fitting 107 that allows a connection to a further rod. If the rod 106 is hollow, it is possible to supply the balancing device 1 with at least one of the following supplies: electrical supply, hydraulic fluids, and/or control signals. If electrical energy is to be supplied through the rod 106 that suitable elements such as cables have to be provided. Such a cable can be arranged inside the rod 106 or it may be mounted for example with clamps on its outer side. Hydraulic fluids, such as oil, air or water, may be provided in a hose that is arranged in the same manner as the cable as described above. It is also possible to use the hollow rod itself as a hose for supplying a fluid to the balancing device 1. If this is the case, the fittings or connectors need to leakproof for the fluid in question.

Recapitulating it may be seen from FIG. 2*a*-*c* that the balancing device 1 according to the preferred embodiment comprises the first section 11, the middle section 12 and the third section 13. The first section 11 and the third section 13 show more or less the same features and the same design for guiding the balancing device 1 in axial direction of the rotor 5, for establishing a contact between the surface of the rotor 5 and the balancing device 1, and for moving the balancing device 1 axially back and forth.

Reference is now made to the second section 12 according to the present embodiment and to FIG. 2*a*. In the second section 12, there is arranged a mounting device 2. The mounting device 2 is responsible for providing the balancing opening with at least one balancing weight. The mounting device 2 comprises at least a holder 200 for receiving and holding the balancing weight and a mounting tool 201 for mounting the balancing weight. The mounting device 2 will be seen in FIGS. 3, 4, 5 and 6, which the following description refers to.

The holder 200 and the mounting tool 201 are arranged in a housing 202 having a base 203 and a cover 204.

Figure 6:
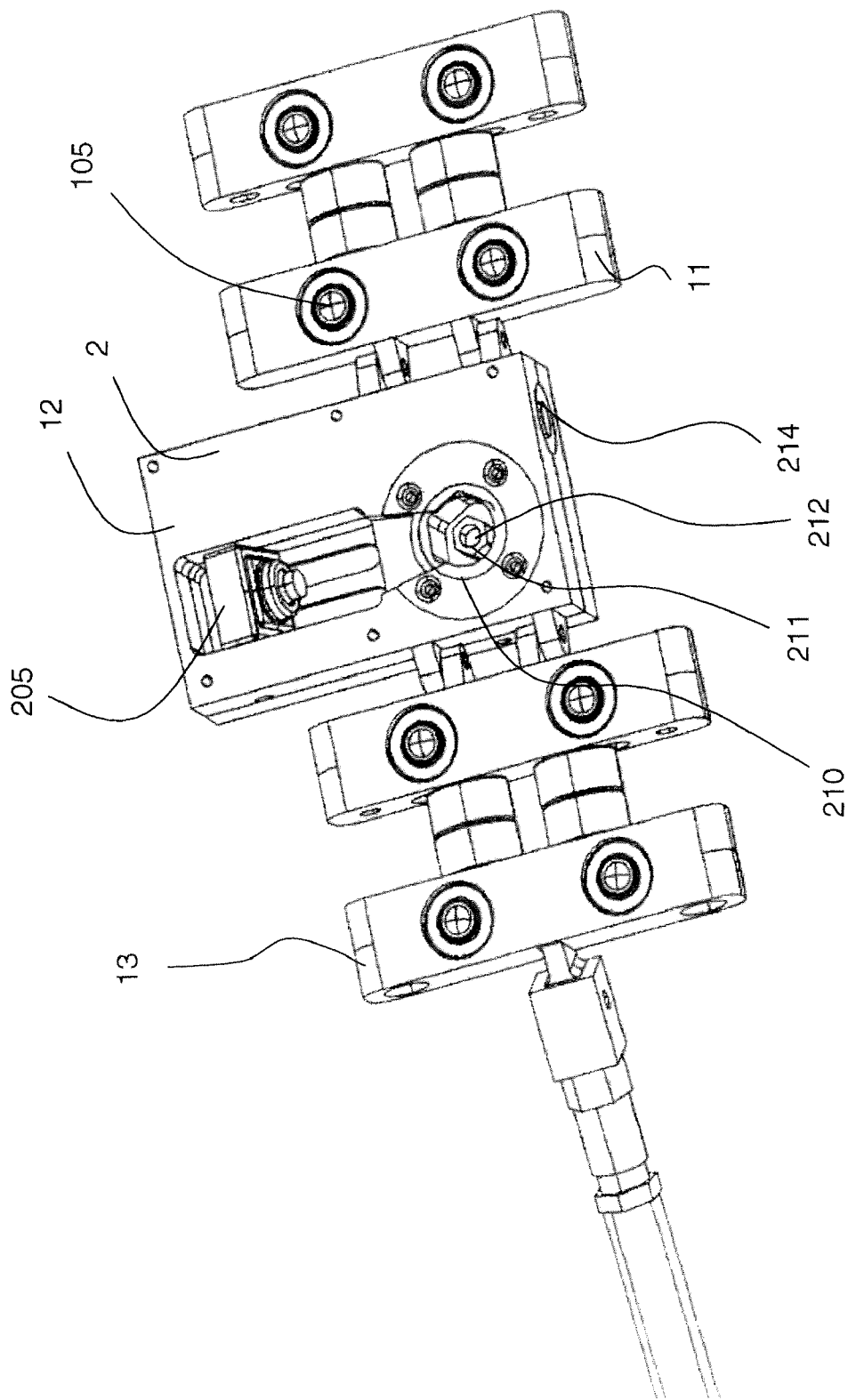
FIG. 6 shows the mounting device of FIGS. 2a to 4 in a detailed perspective view from below.

The holder 200 is shown in FIG. 6. The holder 200 comprises an opening 210 for receiving the balancing weight. Preferably the shape of the opening corresponds to shape of the balancing weight. If the balancing is used as it is described above, the opening 210 is preferably circular. On the bottom 211 of the opening 210 there is arranged a protruding element 212 that is able to hold a balancing weight. Preferably by a magnetic force, hence the protruding element 212 or the balancing must be magnetic or ferromagnetic. The protruding element 212 has a shape that is able to engage in a form closure with the balancing element. It is also possible to designate the protruding element as screwtool 212. In the preferred embodiment and in accordance with the above described balancing weight a hexagonal shape for the screwtool 212 has been chosen. Other shapes such as a groove or any other shape are also possible.

Figure 5:
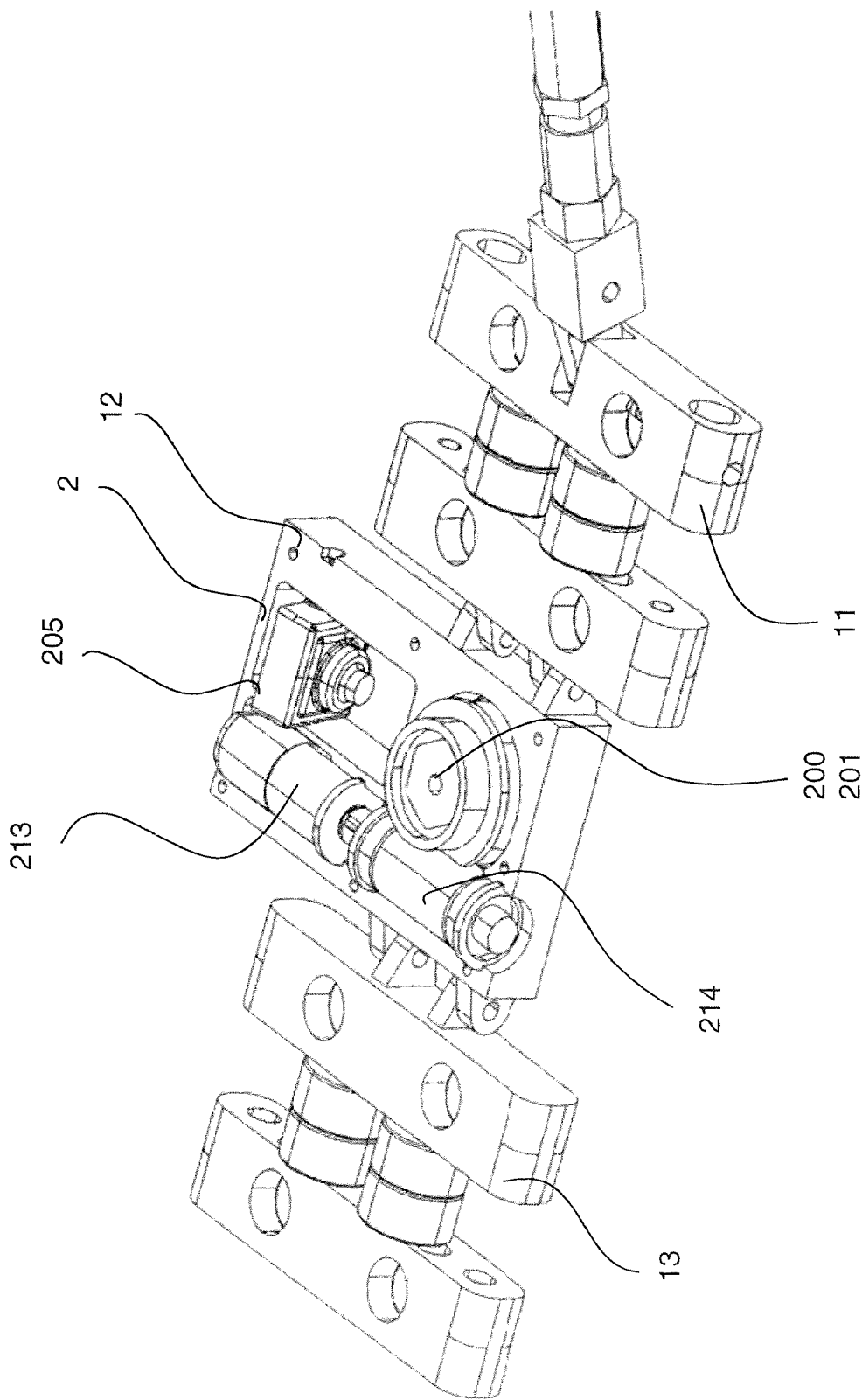
FIG. 5 shows the mounting device of FIGS. 2a to 4 in a perspective view from above with a demounted cover.

The mounting tool 201 comprises an element that is able to move the balancing weight in a longitudinal movement towards the surface of the rotor 5. Such an element may be a hydraulic piston, or a pneumatic piston. Preferably a pneumatic piston will be used that will be driven by introducing air or by removing air, i.e. generating a vacuum. Said element moves the balancing weight to the balancing opening, preferably partly in the balancing opening. After being moved towards the balancing opening the balancing weight may be introduced into the balancing opening. For that reason, the mounting tool 201 comprises furthermore a drive that transmits a rotational movement form the mounting device 2 to the balancing weight. An example is seen in FIG. 5. An electric motor 213 is connected via a worm gear 214 to the screwtool 212. Since the balancing weight is already introduced partly in the balancing opening, the balancing weight has already a contact with the thread that is arranged in the opening. Upon a rotational movement, the balancing weight will be introduced into the balancing opening.

Additionally the mounting device 2 comprises an adjustable camera 205 and light emitting devices. The camera 205 focuses the area of the balancing opening and the surface of the rotor 5. The images, which may be single images or a series of images or a nonstop running image, e.g. a film, are provided via a suitable mean to a display. Such a mean may be a cable or a wireless transmitter. The person that operates the balancing device 1 is able to position the balancing device inside the air gap 7 at a correct position.

Reference is now made to the second section 12 according to the present embodiment and to FIG. 2b. A locking device 3 is now arranged in the second section 12. The locking device 3 is responsible for locking the balancing weight against becoming loose due to vibrations during operation of the electrical machine.

Figure 7:
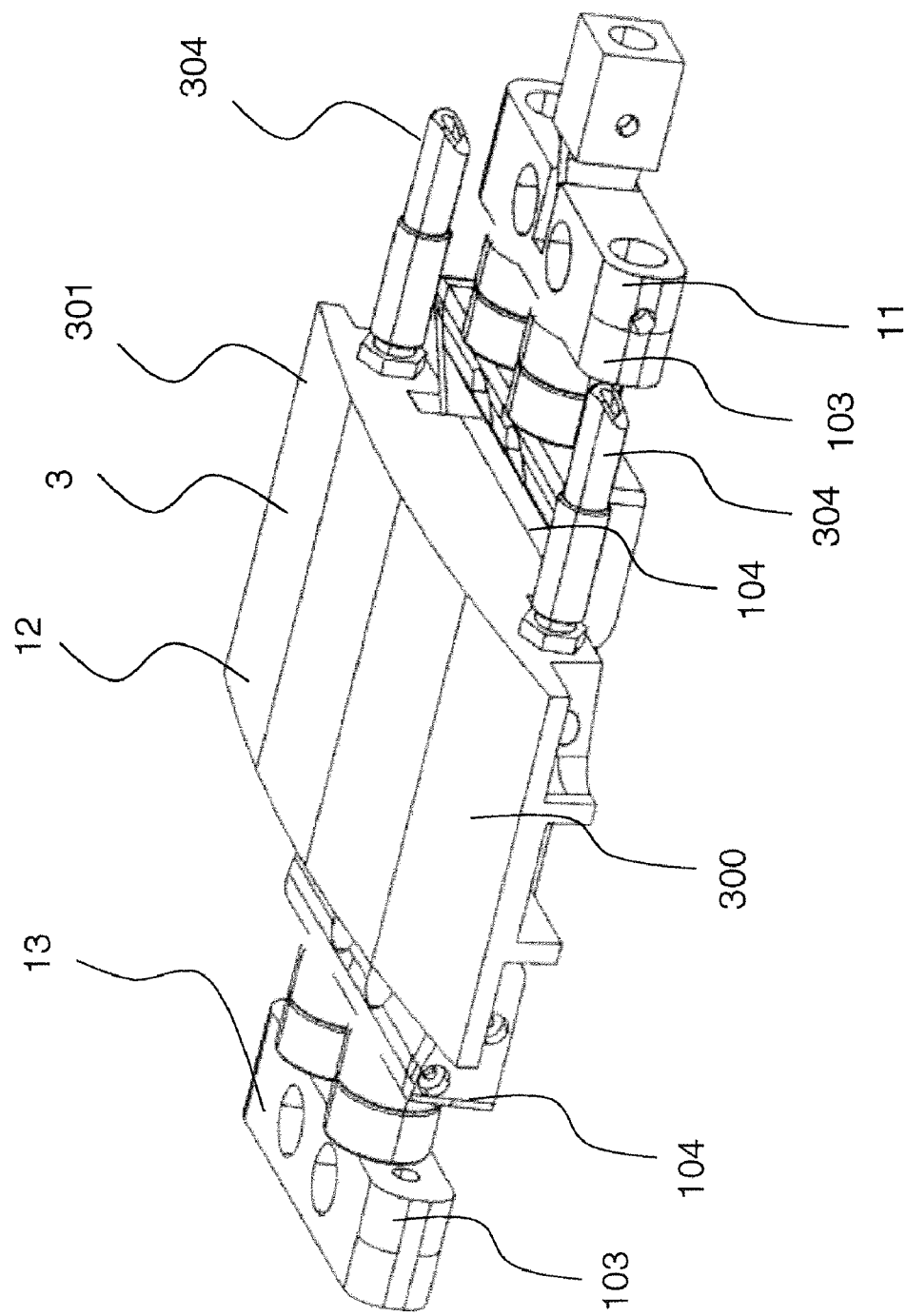
FIG. 7 shows the locking device of FIG. 1 in a perspective view from above.
Figure 8:
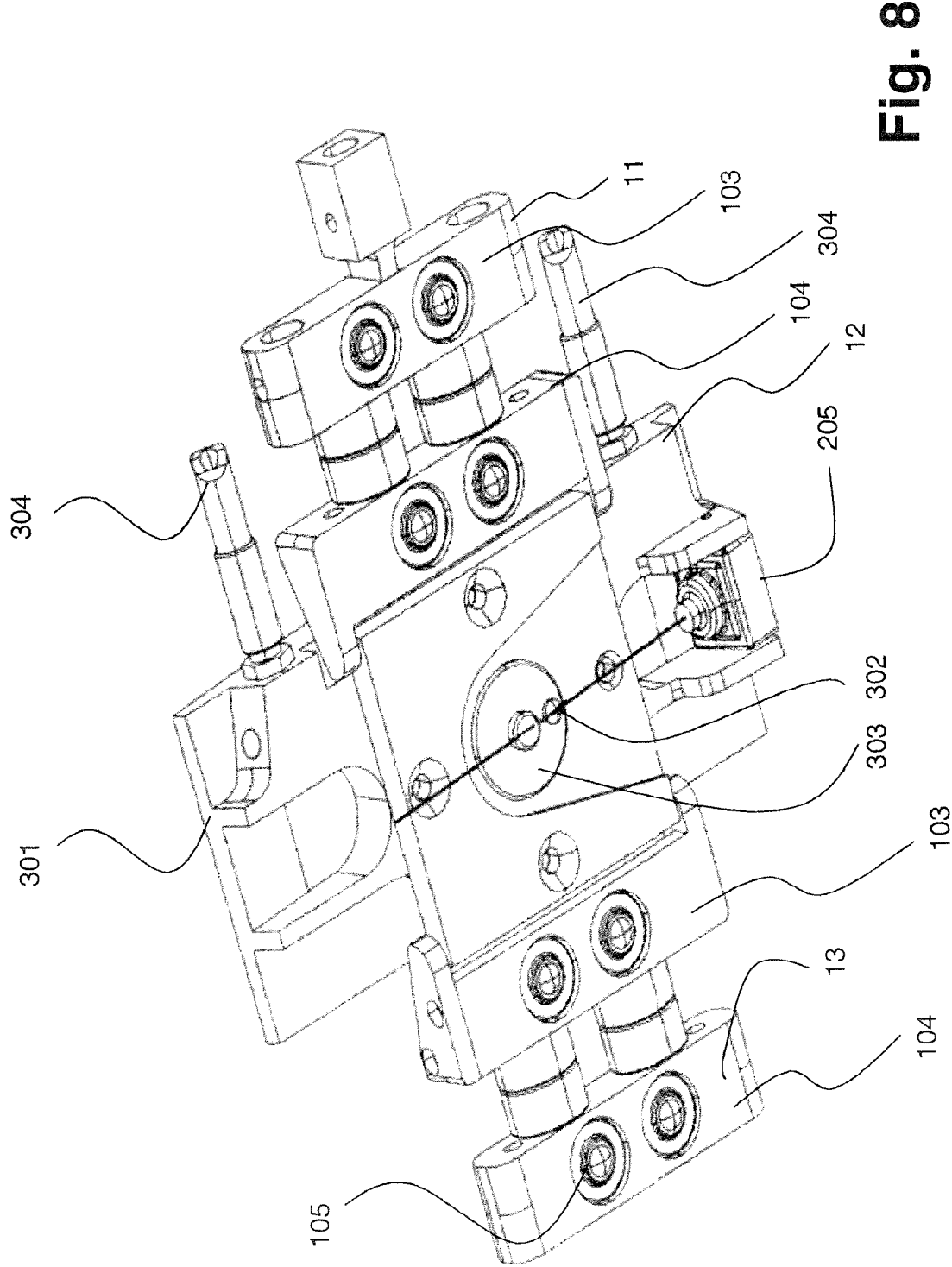
FIG. 8 shows the locking device of FIG. 7 in a perspective view from below.

FIGS. 7 and 8 show the locking device 3 in detail. The locking device 3 comprises a locking tool 300 and a counter plate 301. Thereby the locking tool 300 is arranged on that side of the balancing device which faces the rotor 5. The counter plate 301 is arranged on the side which faces the bore 8 of the stator 6. The locking tool 300 used in the preferred embodiment comprises a hydraulic piston 303 and center punch 302 that is connected to a part of the hydraulic piston 303. The hydraulic piston 303 is provided with a hydraulic fluid via a hydraulic tube 304 in order to be actuated. If the piston 303 is a two-way piston, two hydraulic tubes, as it is shown in FIGS. 6 and 7 have to be present. One of the hoses is for moving the piston out, whereas the other is for moving the piston. If the piston is a one-way piston only one hydraulic hose is necessary. Preferably a two-way hydraulic telescopic piston is used for moving the punch. The center punch 302 will form a punchmark in the area of the edge of the balancing weight and therefore also in the edge of the balancing balancing opening. Thereby the center punch 302 is moved by the hydraulic piston 303. During that procedure of forming the punch, i.e. when the hydraulic piston is actuated, the counter plate 301 will touch surface of the bore 8 of the stator 6 in order to provide a counter force.

The surface of the counter plate 301 is preferably adapted to the radius or the curvature of the bore 8 in the stator 6. Additionally the surface is also fully or at least partly covered by a resilient layer. A rubber sheet is suitable for such a purpose. The curvature and covering is necessary to prevent any damages to the bore 8. A camera 205 having the same characteristics as the camera explained with the mounting device 2 is also arranged. The operator is able to position the locking device 3 at a correct position by using the camera.

Reference is now made to the second section 12 according to the present embodiment and to FIG. 2c. A confirmation device 4 is now arranged in the second section 12. The confirmation device 4 is responsible for the confirmation if all the balancing weights are correctly introduced and all the balancing weights are securely locked.

In further not shown embodiments it is clear that the characteristics applying to the first section or to the second section or to the third section as described above can also be applied to any other section.

With the device according to the present invention it is also possible to place at least one test weight in a balancing opening. Such test weights are used to provide to rotor with an imbalance in order to measure vibrations during a test run or measurement run. Preferably only one of the openings or only one of the rows of balancing openings are provided with a test weight during the procedure of measuring the vibrations. Thereby the balancing device according to the present invention is also able to remove the test weights after a test run. The measured vibrations serve as input data for the influence coefficient matrix. By such a matrix it is possible to determine or calculate the correct position of the balancing weights.

With reference to the drawings one possible embodiment is described. The drawings and the description illustrate a preferred embodiment rather than limit the invention.

LIST OF REFERENCE NUMERALS

1 balancing device
2 mounting device
3 locking device
4 confirmation device
5 rotor
6 stator
7 air gap
8 bore
11 first section
12 second section
13 third section
71 constant clearance
72 varying clearance
73 middle area
74 terminal region
100 hinge
101 magnet
102 magnet
103 first yoke
104 second yoke
105 roller bearing
106 rod
107 fitting/connector
200 holder
201 mounting tool
202 housing
203 base
204 cover
205 camera
210 opening
211 ground
212 protruding element
213 electromotor
214 worm gear
300 locking tool
301 counter plate
302 center punch
303 hydraulic piston
304 hydraulic connector/tube

What is claimed is:

1. Balancing device (1) for balancing a rotor (5) of an electrical machine, said machine comprising a mounted rotor (5) in a central bore (8) of a stator (6) and coaxially thereto, wherein between the rotor (5) and the stator (6) there is an air gap (7) having a substantially constant clearance (71) in a middle area (73) of the rotor (5) due to a cylindrical shape of the rotor (5) and bore (8), and a varying clearance (72) in terminal regions (74) due to varying diameters of the rotor (5) and bore (8), the balancing device (1) comprises at least a first section (11) and a second section (12) that are moveable in respect of each other and a third section (13) that is moveable in respect of the first section (11) and in respect of the second section (12), in order to pass through the air gap (7) in the terminal regions, at least one of the first section (11) or the second section (12) or the third section (13) comprise at least a guiding element (101, 102) for circumferential guidance, a contact element (105) for establishing a contact between the surface of the rotor (5) and the device (1), and actuation element (106), for axial movement of the device (1), said rotor (5) comprising a plurality of axially extending ferromagnetic teeth and non-magnetic wedges arranged alternately around the circumference of the surface of the rotor (5), at least one of the teeth or the wedges comprise balancing openings for balancing weights, the balancing device (1), configured to be mounted to the rotor, comprises at least one of a mounting device (2) or a locking device (3) or a confirmation device (4), said device having a radial height that is smaller than a minimal clearance of the air gap (7) and an axial extension such that it can be inserted into the air gap (7) wherein the contact element is a roller bearing (105).

2. Balancing device according to claim 1, wherein the guiding element comprises at least a first magnet (101) and a second magnet (102), wherein the magnetic field of the first magnet (101) and of the second magnet (102) interacts with the field of the ferromagnetic teeth of the rotor (5), causing the balancing device (1) to be centrally arranged over at least one of the ferromagnetic teeth or over at least one of the nonmagnetic wedges.

3. Balancing device according to claim 1, wherein the actuation element is a flexible rod (106) that is pivotably connected to the balancing device (1).

4. Balancing device according to claim 3, wherein the rod (106) is hollow and has a connector at its end in preferably for connecting to further rods.

5. Device according to claim 4, wherein the rod (106) is used to provide the device (1) with at least one of the following supplies: electrical supply, hydraulic fluids or control signals.

6. Device according to claim 1, wherein the device (1) comprises an adjustable camera (205) as a positioning aid and a light emitting device for providing light in the focus area of the camera (205), wherein the image captured by the camera (205) is transmittable to a display.

7. Device according to claim 1, wherein the device comprises a camera (205) in order to confirm that the balancing weight is correctly mounted and securely locked.

8. Balancing device (1) for balancing a rotor (5) of an electrical machine, said machine comprising a mounted rotor (5) in a central bore (8) of a stator (6) and coaxially thereto, wherein between the rotor (5) and the stator (6) there is an air gap (7), said rotor (5) comprising a plurality of axially extending ferromagnetic teeth and non-magnetic wedges arranged alternately around the circumference of the surface of the rotor (5), at least one of the teeth or the wedges comprise balancing openings for balancing weights, the balancing device (1) comprises a mounting device (2), said device comprising in one of its sections (11, 12, 13) a holder (200) for holding at least one balancing weight and a mounting tool (201) for mounting the balancing weight and having a radial height that is smaller than a minimal clearance of the air gap (7) and an axial extension such that it can be inserted into the air gap (7).

9. Device according to claim 8, wherein the holder (200) is a magnetic element, and the mounting tool (201) for mounting the balancing weight is able to move the balancing weight longitudinally towards the balancing opening in the rotor (5), wherein the mounting tool (201) is the magnetic element which shows a shape that is able to engage in a form closure with the balancing weight in order to be able to transmit a torque and a rotational movement from the mounting tool (201) to the balancing weight to insert the balancing weight in the balancing opening in the rotor (5).

10. Device according to claim 9, wherein the mounting tool (201) comprises a drive for said longitudinal movement and in that the mounting tool comprises a drive for said rotational movement.

11. Balancing device (1) for balancing a rotor (5) of an electrical machine, said machine comprising a mounted rotor (5) in a central bore (8) of a stator (6) and coaxially thereto, wherein between the rotor (5) and the stator (6) there is an air gap (7), said rotor (5) comprising a plurality of axially extending ferromagnetic teeth and non-magnetic wedges arranged alternately around the circumference of the surface of the rotor (5), at least one of the teeth or the wedges comprise balancing openings for balancing weights, the balancing device (1), configured to be mounted to the rotor, comprises at least one of a mounting device (2) or a locking device (3) or a confirmation device (4), said device having a radial height that is smaller than a minimal clearance of the air gap (7) and an axial extension such that it can be inserted into the air gap (7), wherein the locking device (3) comprises on a side facing the surface of the rotor (5) a locking tool (300) for locking the balancing weight.

12. Device according to claim 11, wherein the locking tool (300) for locking the balancing weight is a center punch (302) that is driven by a hydraulic piston (303) in order to provide a punchmark for securing the balancing weight against loosening due to vibrations.

13. Device according to claim 12, wherein the locking device (3) comprises in one of its sections on its side facing a surface of the stator (6) a counter plate (301) that is at least partly covered with a resilient material, said counter plate being pushed against the stator (6) when the punchmark is being formed.

* * * * *